(12) United States Patent
Amini (10) Patent No.: US 12,237,163 B2
(45) Date of Patent: Feb. 25, 2025

(54) SHAPED CENTRAL ELECTRODE INSIDE RADIO FREQUENCY RAIL TO CONTROL ASPECTS OF AN ION TRAP

(71) Applicant: IonQ, Inc., College Park, MD (US)

(72) Inventor: Jason Madjdi Amini, Takoma Park, MD (US)

(73) Assignee: IonQ, Inc., College Park, MD (US)

( * ) Notice: Subject to any disclaimer, the term of this patent is extended or adjusted under 35 U.S.C. 154(b) by 418 days.

(21) Appl. No.: 17/877,334

(22) Filed: Jul. 29, 2022

(65) Prior Publication Data

US 2023/0032907 A1 Feb. 2, 2023

Related U.S. Application Data

(60) Provisional application No. 63/227,109, filed on Jul. 29, 2021.

(51) Int. Cl.
*H01J 49/42* (2006.01)
*G06N 10/40* (2022.01)

(52) U.S. Cl.
CPC ........ *H01J 49/422* (2013.01); *H01J 49/4265* (2013.01); *G06N 10/40* (2022.01)

(58) Field of Classification Search
CPC .... H01J 49/422; H01J 49/4265; G06N 10/40; G21K 1/00

USPC .......................................... 250/292
See application file for complete search history.

(56) References Cited

U.S. PATENT DOCUMENTS

| | | | | |
|---|---|---|---|---|
| 10,418,443 | B1 * | 9/2019 | Nordquist | H01L 29/66977 |
| 11,404,179 | B2 * | 8/2022 | Cao | G06N 10/40 |
| 2022/0367164 | A1 * | 11/2022 | Blain | G06N 10/40 |
| 2023/0187095 | A1 * | 6/2023 | Volin | G21K 1/003 |
| 2024/0312664 | A1 * | 9/2024 | Auchter | G21K 1/087 |

* cited by examiner

*Primary Examiner* — Kiet T Nguyen
(74) *Attorney, Agent, or Firm* — ARENTFOX SCHIFF LLP (57) ABSTRACT

A shaped central electrode is described that is placed between a pair of radio frequency (RF) rails of a trap configured to hold atomic-based qubits to control aspects of the operation of the trap. In one aspect, the shaping may involve forming a pinched region in the middle of the central electrode. The middle of the central electrode may correspond to the middle portion of the trap. The shaping of the central electrode may be achieved in different ways and may involve varying the width of the central electrode. The trap may be fabricated on a glass die or substrate, which itself may be shaped or not. The trap may be fabricated by various methods such as, but not limited to, patterned metal layers on glass or silicon substrates. A quantum information processing (QIP) system is also described that may include a trap having any of these features.

20 Claims, 8 Drawing Sheets

SHAPED CENTRAL ELECTRODE INSIDE RADIO FREQUENCY RAIL TO CONTROL ASPECTS OF AN ION TRAP

PRIORITY

This application claims priority to and the benefit from U.S. Provisional Application No. 63/227,109, filed on Jul. 29, 2021, and titled "Shaped Single Central Electrode Inside RF Rail to Control Various Aspects of an Ion Trap," the contents of which are incorporated herein by reference in their entirety.

BACKGROUND

Aspects of the present disclosure relate generally to trapping devices for use in the implementation, operation, and/or use of quantum information processing (QIP) systems.

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes the use of a shaped central electrode inside the radio frequency (RF) rail of a trap configured to hold atomic-based qubits to control aspects of the operation of the trap. When the atomic-based qubits held by the trap are ions, the trap may be referred to as an ion trap. In one aspect, the shaping may involve forming a pinched region in the middle of the central electrode. The middle of the central electrode may correspond to the middle portion of the trap. The shaping of the central electrode may be achieved in different ways. For example, the shaping may involve varying the width of the central electrode (e.g., pinching, sharp changes) in the middle of the central electrode and/or in regions nearby the middle of the central electrode. The trap may be fabricated on a glass die or substrate, which itself may be shaped or not. The trap may be fabricated by various methods such as, but not limited to, patterned metal layers on glass or silicon substrates. A QIP system is also described that may include a trap having any of these features.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

For some traps used in QIP systems it would be helpful to get electrodes into the center or the middle of the trap because the outer electrodes are far from where the ions are positioned and may not look that different from each other to a faraway ion. By bringing electrodes nearby (e.g., underneath) where the ions are located it may be possible to have better control of the ions, and thus, a better operation of the overall QIP system. However, this is hard to do for single metal layer traps or traps with limited connectivity.

Solutions to the issues described above are explained in more detail in connection with FIGS. 1-7, with FIGS. 1-3 providing a background of QIP systems or quantum computers, and more specifically, of atomic-based QIP systems or quantum computers.

Figure 1:
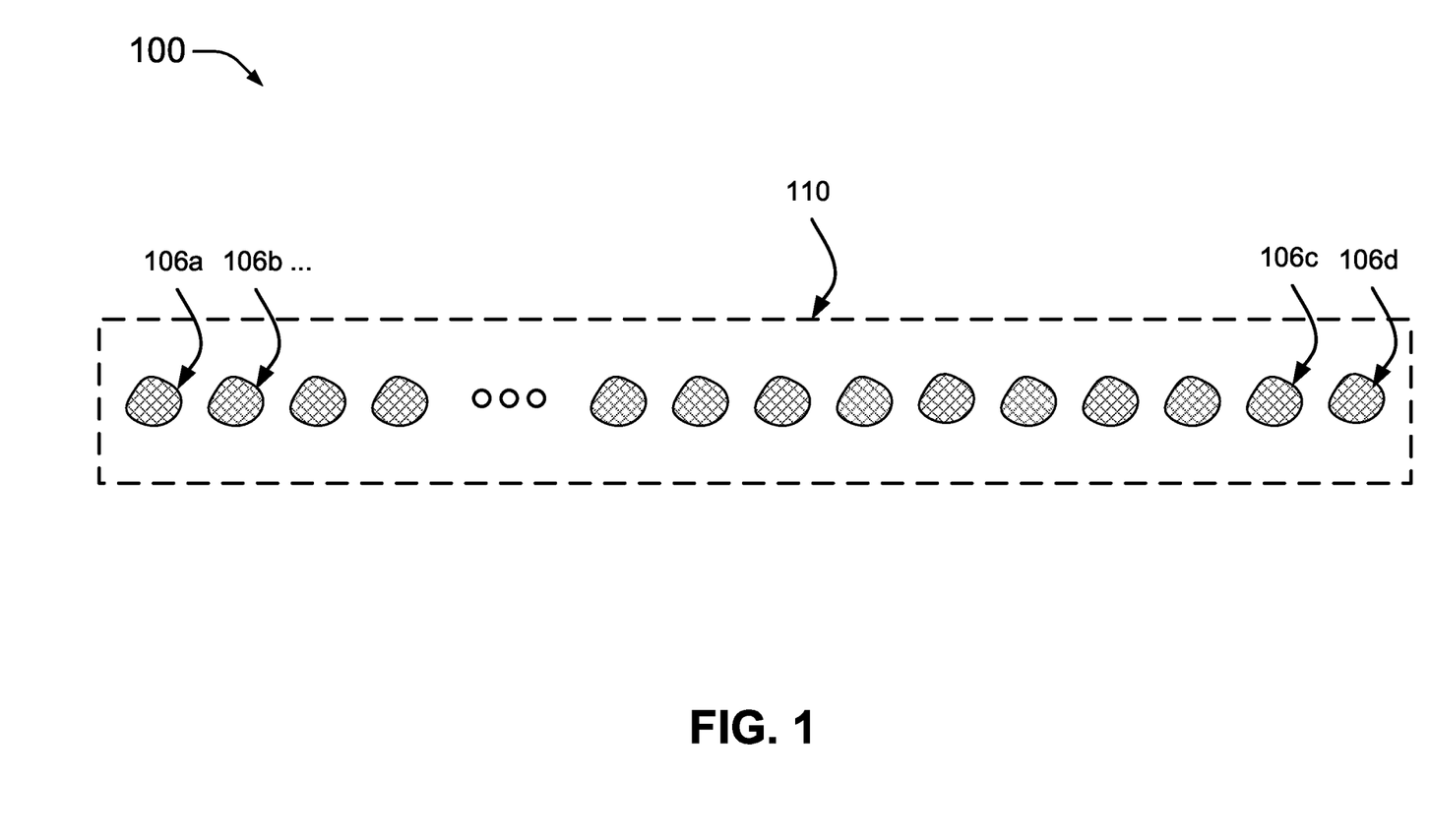
FIG. 1 illustrates a view of atomic ions a linear crystal or chain in accordance with aspects of this disclosure.
Figure 2:
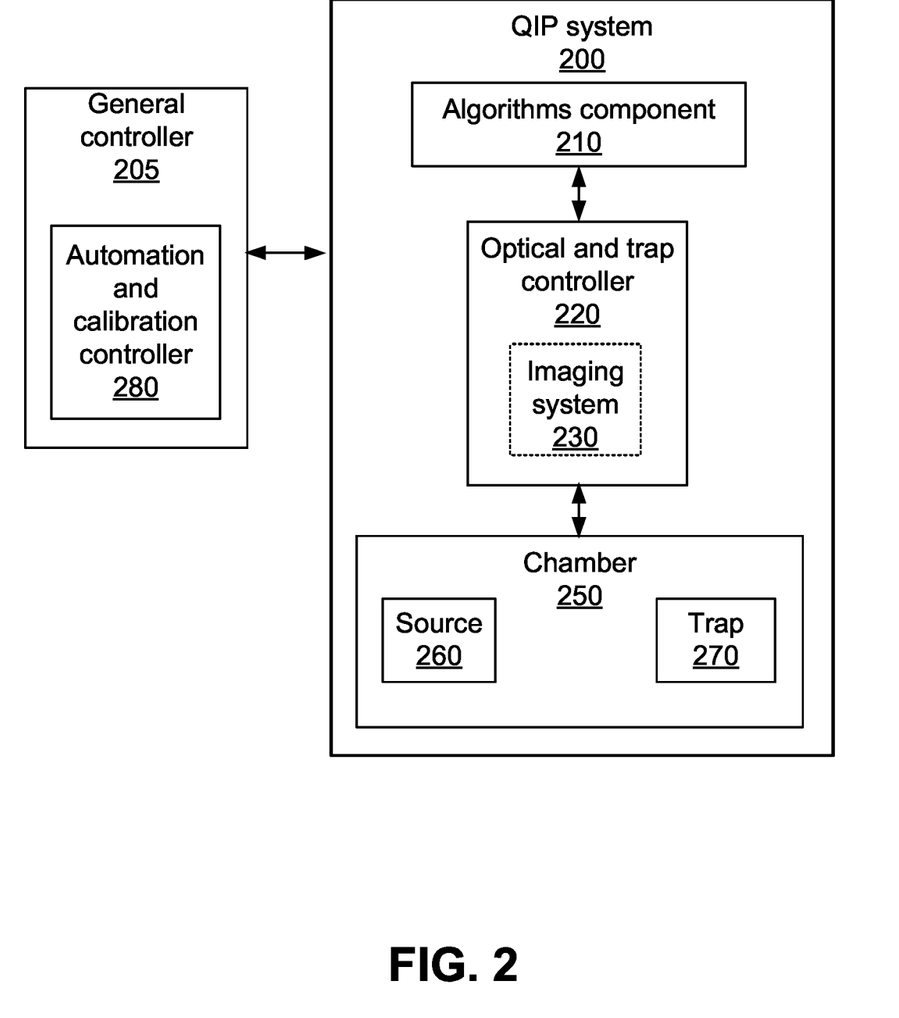
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap may be referred to as an ion trap. The ion trap shown may be built or fabricated on a semiconductor substrate, a dielectric substrate, or a glass die or wafer (also referred to as a glass substrate). Several features of ion traps related to this disclosure are described below in connection with FIGS. 4-7. The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. For example, the optical and trap controller 220 may be configured to control the generation of radio frequency (RF) signals to be applied to RF electrodes in the trap 270 and direct current (DC) signals to be applied to DC electrodes in the trap 270. Several features of ion traps related to this disclosure that may be used as the trap 270 are described below in connection with FIGS. 4-7.

The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the trap 270. Additional aspects may be implemented using the optical and trap controller 220 and/or the chamber 250.

Figure 3:
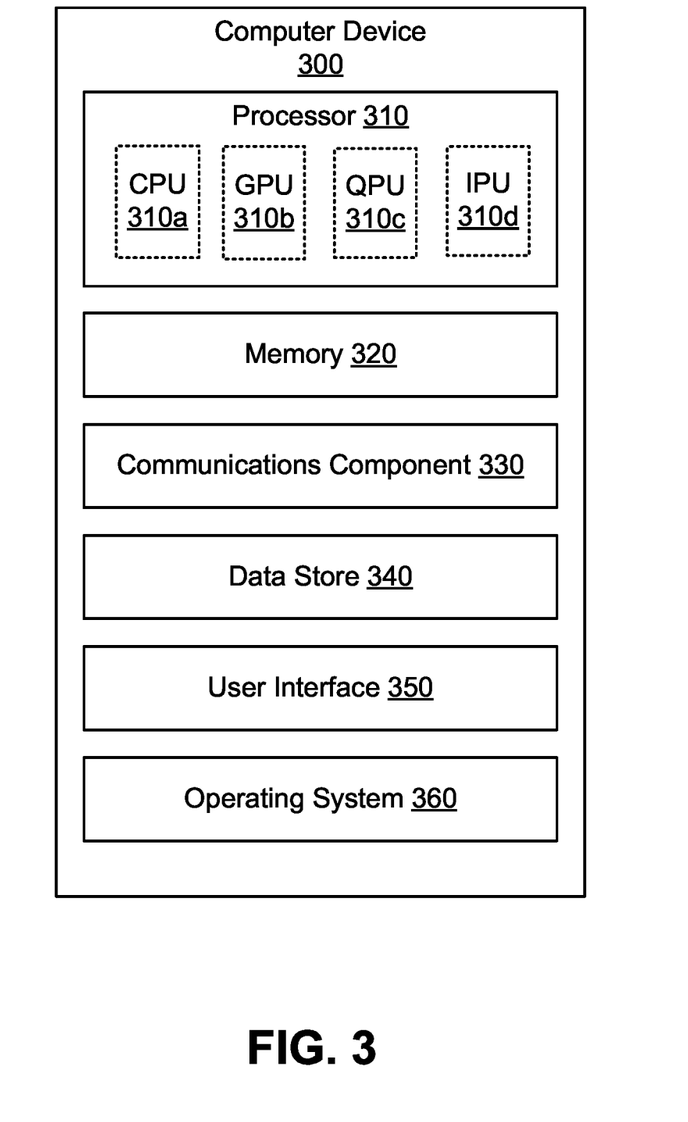
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, it would be helpful to get electrodes into the center or the middle of the trap (e.g., the trap 270) to have better control of the ions, and thus, a better operation of the overall QIP system.

Figure 4:
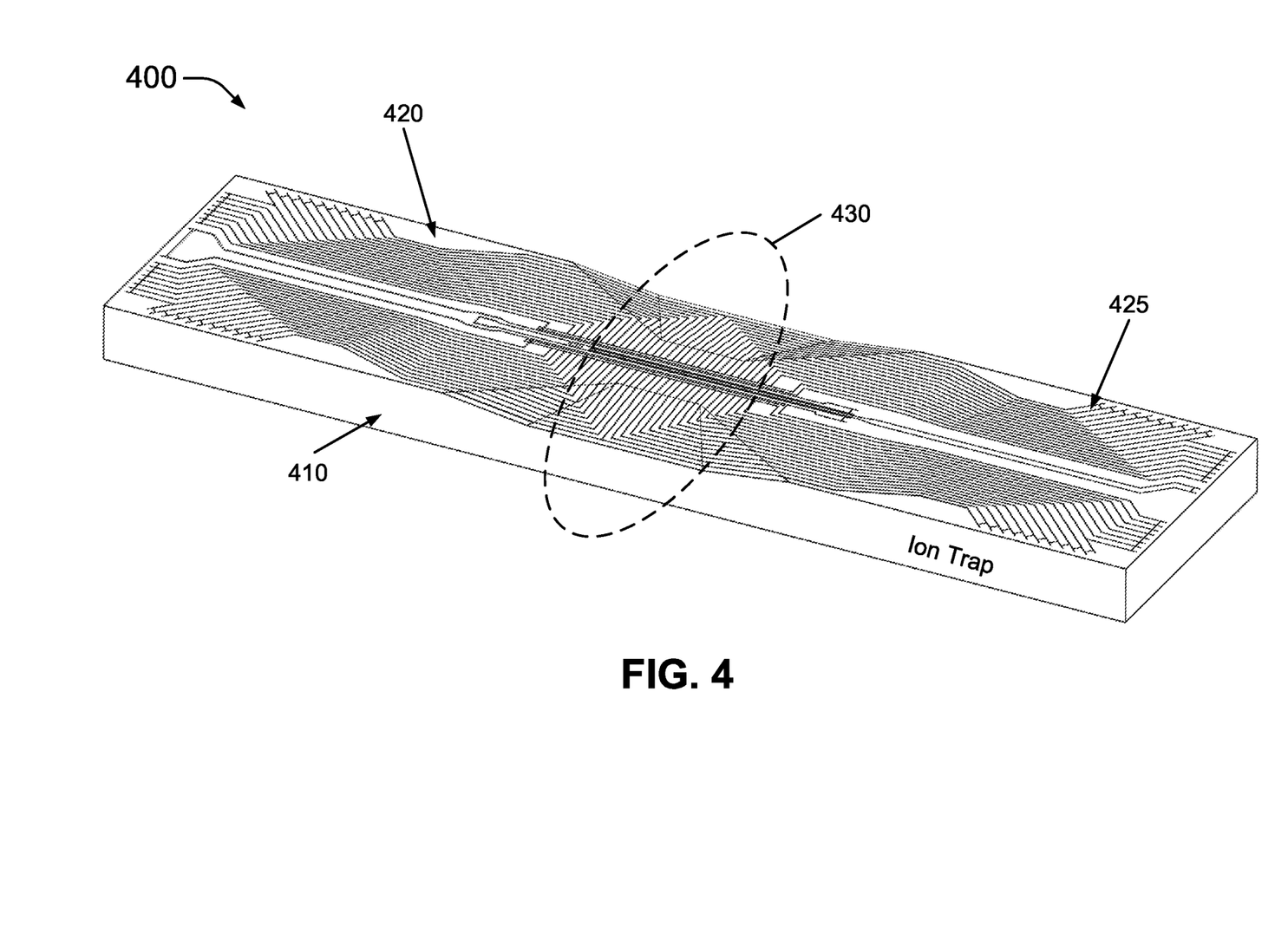
FIG. 4 illustrates an isometric view of an example of an ion trap in connection with aspects of this disclosure.

FIG. 4 shows a diagram 400 that illustrates an isometric view of an ion trap. The ion trap shown may be built or fabricated on a glass die or wafer 410, also referred to as a glass substrate. As shown, the glass substrate 410 may be an elongated device, where one direction may be along the length of the device and another direction may be along the width of the device. Although shown to have a rectangular shape in this example, the glass substrate 410 need not be limited to such a shape. An example of a material used for such glass substrates is fused silica, but other glass-like materials may also be used.

The ion trap may be fabricated by evaporating, sputtering, or otherwise depositing a metal layer or metal layers 425 over a surface or surfaces 420 of the glass substrate 410, where the surface or surfaces 420 are appropriately etched or shaped to produce grooves and undercuts that provide isolation between electrodes formed by the metal layer 425. The surface 420 may be referred to as a top surface when it is the topmost surface of the glass substrate 410, for example. This metal layer 425 may be a single metal layer, however, multiple metal layers may also be used. The metal layer 425 may be made of pure metals or alloys. The electrodes that are formed over surface 420 are routed from both ends of the ion trap (e.g., the distal ends of the ion trap) to a center or middle region 430 of the ion trap. As shown, at the distal ends of the trap the electrodes may be angled to facilitate wire bonding between the electrodes on the ion trap and electrical traces on a substrate or interposer onto which the ion trap is placed. It is in the region 430 that the other end of the electrodes terminate and where the ions 106 in the linear crystal or chain 110 illustrated in FIG. 1 are trapped. When the ion traps described herein are made by evaporation of the metal layer 425 the ion traps may be referred to as evaporated glass traps or EGTs.

As a variation of the structure described above, rather than using a layer of metal 425, a layer of a non-metallic conductive coating 425 may be used instead. An example of a non-metallic conductive material is indium tin oxide (ITO), but other such materials may also be used.

The shaped central electrode described herein may be implemented on the glass substrate traps described herein; however, it may also be implemented in other types of traps made by other methods and of other materials. For example, the shaped central electrode may also be implemented on traps that are fabricated from patterned metal layers on glass or silicon substrates. Moreover, the features of the shaped central electrode are not only applicable to traps that use ion-based qubits but also to traps that use any type of atomic-based qubits.

The ion trap shown in the diagram 400 in FIG. 4 includes features for electrodes with metalized trenches and open light access. These ion traps may be fabricated by shaping the glass substrate 410 (e.g., by using laser writing and etching techniques) and then evaporating one or more metal layers 425 on top (see e.g., process details provided in FIG. 7). Regions shadowed by overhangs in the glass shape form disconnects between regions of metal, allowing for many isolated electrodes on a single device. Further shaping of the trap may be achieved by, for example, forming beveled, slanted, or angled cutout regions, which may provide light access improvements over that of a flat surface. For example, better access by a focused laser or optical beam can be provided to the trapped ions by removing portions of the trap that could otherwise interfere with the focused laser or optical beam. The metallization used in the evaporation process to form the electrodes can include a single metal (e.g., gold (Au)) or a layering of different metals (e.g., chromium (Cr) then Au). As mentioned above, metal alloys that provide the appropriate mechanical and electrical properties may also be used in the metal evaporation process. Ion traps that rely on features or fabrication methods different from those described above may also be used to implement the shaped central electrode described in this disclosure.

Figure 5A:
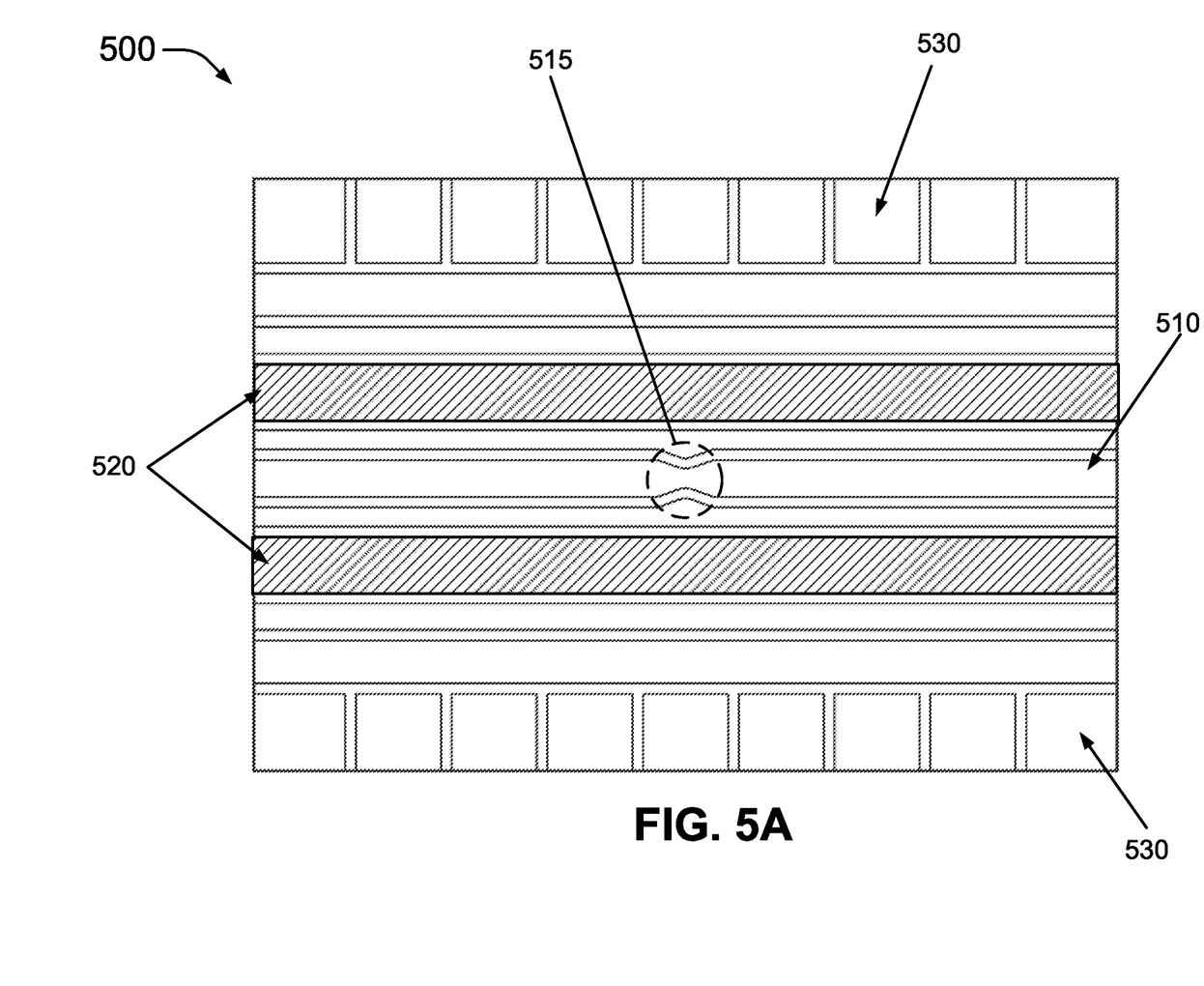
FIG. 5A illustrates a top view of a portion of the ion trap in FIG. 4 that illustrates a shaped central electrode in connection with aspects of this disclosure.

FIG. 5A shows a diagram 500 that illustrates a top view of a portion of the center or middle region 430 of the ion trap in FIG. 4. The diagram 500 shows arrays of outer direct current (DC) electrodes 530 to either side (e.g., top and bottom of the figure) of a pair of radio frequency (RF) rails 520 (i.e., first and second RF rails or electrodes). The pair of RF rails 520 are shown with a dashed fill lines for ease of identification. The ions that the trap holds for use in quantum operations are positioned above the central electrode 510, with the central electrode 510 being positioned between the top outer DC electrodes 530 and the bottom outer DC electrodes 530 and also between a pair of RF rails 520.

As noted above, it would be helpful to get DC electrodes into the center or the middle of the trap because the outer DC electrodes 530 are far from where the ions are positioned and may not look that different from each other to a faraway ion. For example, more specific trap functionality such as the tight control of anharmonic potentials for uniform ion spacing in chain of ions would be difficult to achieve by solely using the outer DC electrodes 530 because they may be far from the ions. By bringing DC electrodes underneath (e.g., nearby) where the ions are positioned it may be possible to have better control of the ions. Because bringing several electrodes to achieve this functionality into the middle or center of the trap is hard to do, particularly in single metal layer traps or traps with limited connectivity, this disclosure proposes using a single central electrode that is shaped to provide the appropriate functionality such as a particular component of the confining potential, for example. By using this approach, it may be possible to generate the desired potentials for ion control even with a limited number of control signals and electrodes.

Traps are generally designed as general-purpose devices and are not customized to handle specific functionalities such as the tight control of the confining potentials. The proposed use of a shaped central electrode allows the trap to become a specialty device while keeping the general-purpose features such as the arrays of outer DC electrodes 530. That is, the use of a shaped central electrode is a specialty electrode that allows for the control of designer potentials while everything else in the trap supports the uniform and repetitive features of a general-purpose device.

Returning to FIG. 5A, the top view offered by the diagram 500 shows a central electrode 510, which is an implementation of the shaped central electrode proposed by this disclosure. The central electrode 510 is a DC electrode and may also be referred to as the DC electrode 510 or the DC central electrode 510. The central electrode 510 is shaped to enable some of the functionality described above that allows better control the ions confined by the trap. The shaping of the DC electrode 510 is illustrated by a "pinching" 515 of the electrode's width, which is this case is shown near or at the middle of the central electrode 510 although the positioning of the pinching 515 need not be so limited. This pinching is shown by a curvature in the electrode that provides a smooth narrowing of the width and a similarly smooth return to the original width. The remaining portions of the central electrode 510 are typically of a uniform, constant width, although there may be additional shaping in parts of the central electrode 510. Because of the placement between the outer DC electrodes 530 and the pair of RF rails 520, and because of the shaping (e.g., the pinching 515), the central electrode 510 may also be referred to as a shaped central electrode.

As noted above, the pair of RF rails 520 includes two RF rails or electrodes (e.g., a first RF rail/electrode and a second RF rail/electrode) that are used to provide confinement of the ions above the surface of the trap perpendicular to the lengths of the RF rails (e.g., radial confinement). The outer DC electrodes 530 provide confinement and transport potentials parallel to the RF rails (e.g., axial confinement).

Figure 5B:
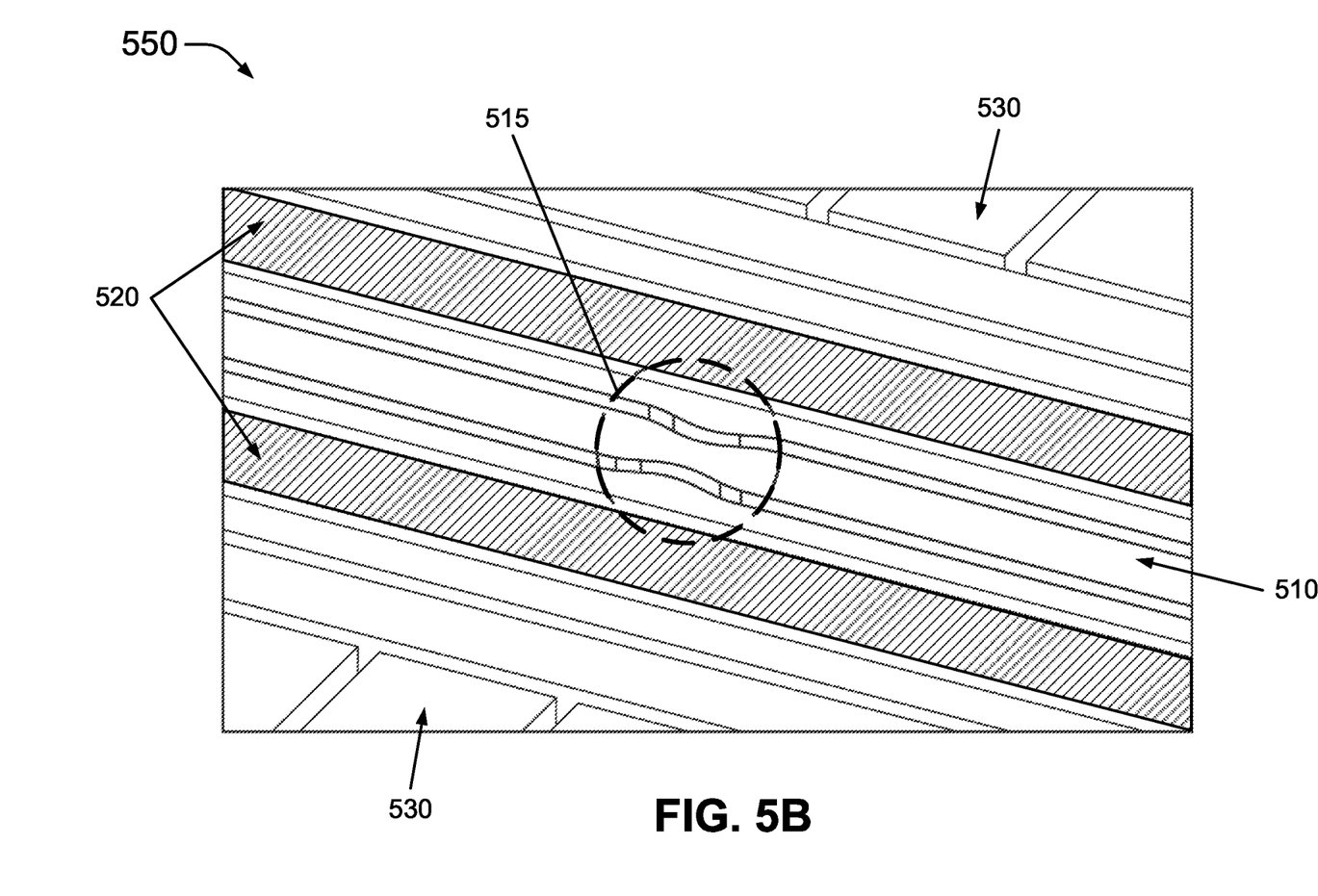
FIG. 5B illustrates an isometric view of the shaped central electrode in FIG. 2A.

FIG. 5B shows a diagram 550 that simply illustrates an isometric view of the shaping of the central electrode 510. The pinching or pinched region 515 is shown where the central electrode 510 changes its width to provide the specific components to the potential that are desired for the trap operation. The diagram 550 also shows the outer DC electrodes 530 and the pair of RF rails 520, as well as the spacing or physical isolation (e.g., trenches, grooves) between different electrodes on the trap.

Figure 6:
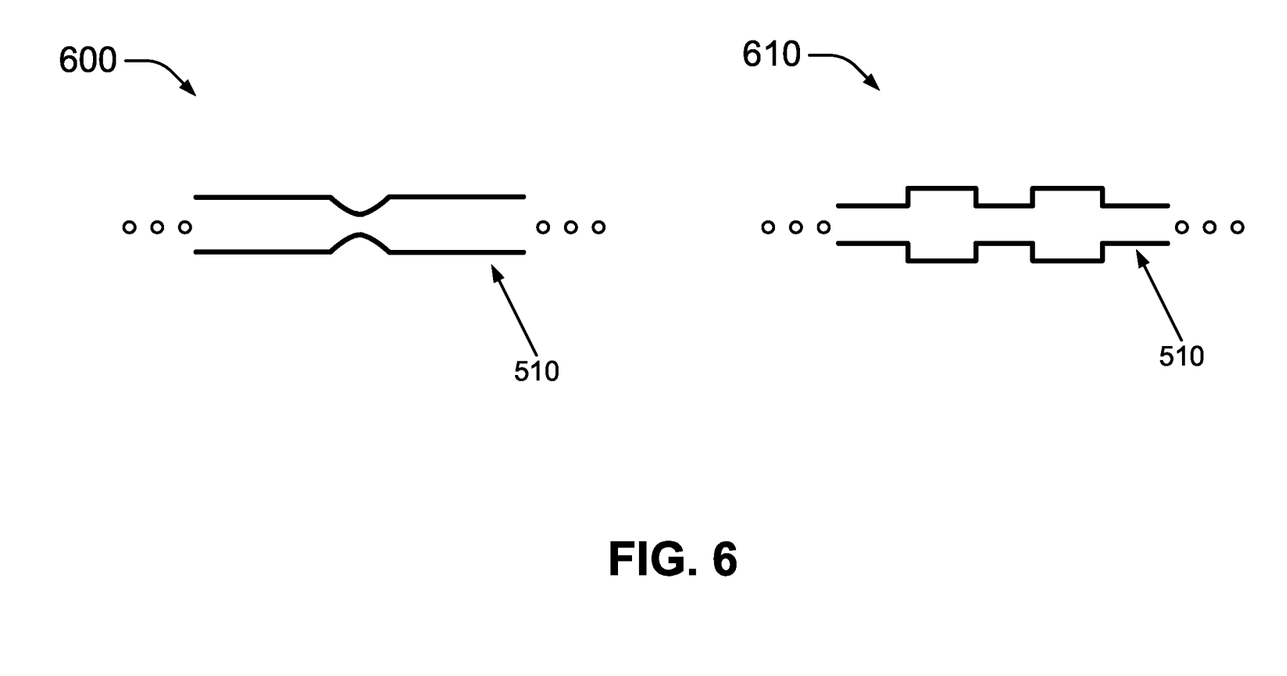
FIG. 6 illustrate examples of shaping of a central electrode in connection with aspects of this disclosure.

FIG. 6 illustrates examples of different types of shaping that may be applied to the central electrode 510 described above. A diagram 600 in FIG. 6 shows shaping by using pinching of the electrode width. This is similar to the shaping (e.g., the pinching 515) described in connection with the diagrams 500 and 550 in FIGS. 5A and 5B, respectively.

A diagram 610 in FIG. 6 shows a different type of shaping. This shaping is produced by varying or changing the width of the central electrode 510 in steps. In this example, the width of the central electrode 510 is increased in a small region by means of a first step change, then the width decreases to the original width for another region by means of a second step change, then the width is increased again by means of a third step change, and finally the width decreases to the original width for another region by means of a fourth step change. Other than in the region where the shaping occurs, the width of the central electrode generally remains substantially uniform along its length.

It is to be understood that the examples in the diagrams 600 and 610 are provided by way of illustration and not of limitation. Moreover, while these examples show shaping in the middle of the central electrode 510, there may be shaping in more than one location or region of the central electrode 510 to achieve the desired potential. Moreover, when the central electrode 510 is shaped in multiple locations or regions, the shaping need not be the same in all of the regions and could be different types of shaping in different regions.

Figure 7:
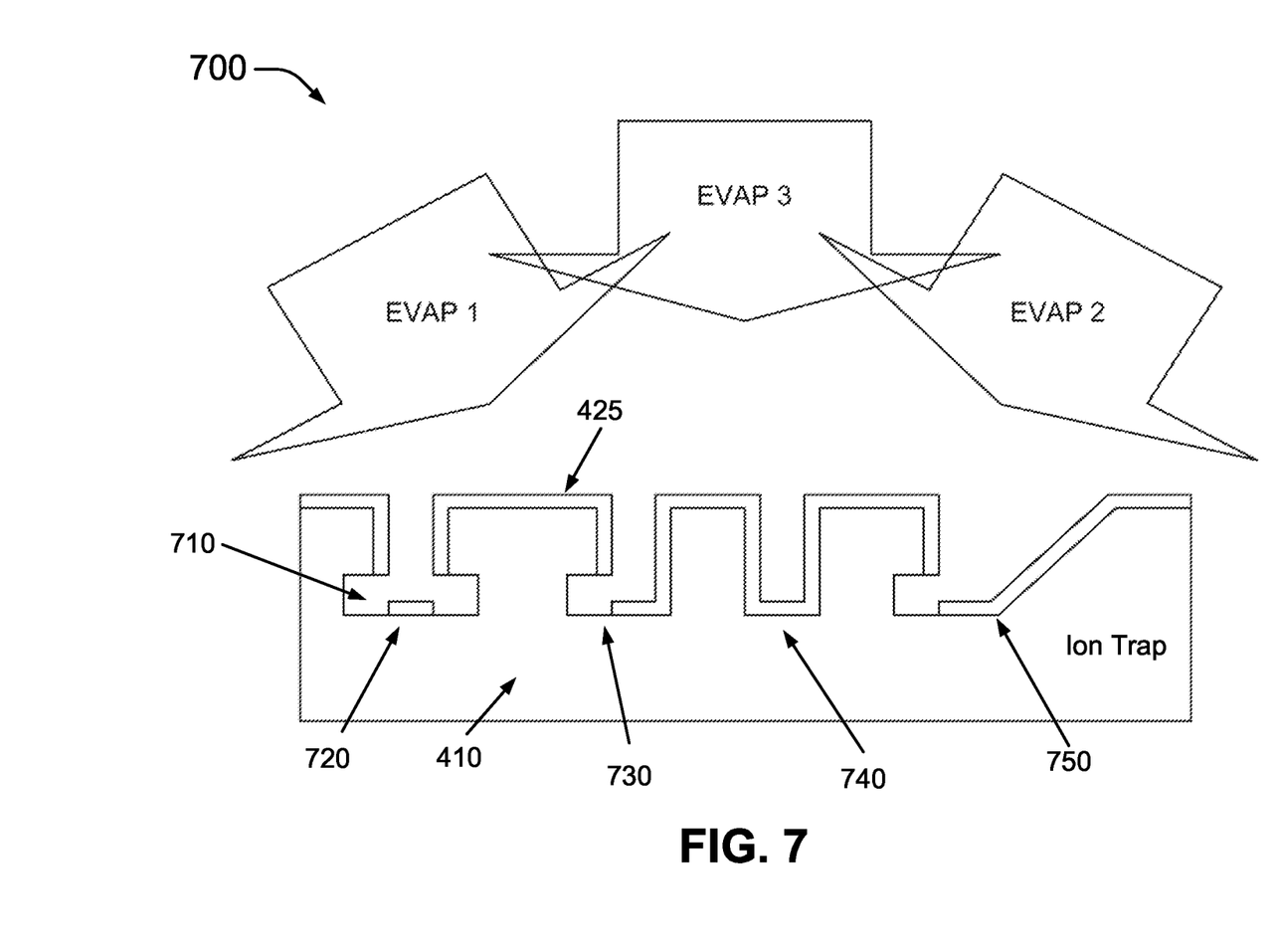
FIG. 7 illustrates a cross section of examples of electrode structures that may be used for the shaped central electrode in connection with aspects of this disclosure.

FIG. 7 shows a diagram 700 that illustrates a cross section of an ion trap with different types of electrode or shadow structures that may be formed to produce the trap's electrodes. Each of the structures shown may be used in the trap fabrication for a particular use. Moreover, one or more of these structures may be used to implement the trap's electrodes, including the shaped central electrode described above in connection with the diagrams 400, 500, 550, and 600 in FIGS. 4-6.

The glass substrate 410 is processed by appropriately shaping the top surface. For example, the top surface may be shaped by using one or more different types of etching techniques to produce the different electrode or shadow structures. The glass substrate 410 is shaped first and then a metal coating (e.g., the metal layer 425) is evaporated over the glass substrate 410. As mentioned above, the metal coating may include a single metal (e.g., Au) or a layering of different metals (e.g., Cr then Au).

The metal coating may be deposited (e.g., via evaporation) at various angles (e.g., see different evaporation angles EVAP 1, EVAP 2, and EVAP 3) to coat the top surface, the exposed bottom surfaces, the sidewalls, and the angled wings or sloped walls that result from the shaping of the top surface. The coating may either occur in steps with discrete angles to the deposition source, by continuous movement during the deposition process, or by a combination of both techniques. The approach described herein may form isolated trap electrodes by, for example, implementing one or more of the following features: undercuts 710, undercut on both sides 720, undercut on one side 730, no undercut 740, and a sloped wall 750. In some cases, two undercut features may result in a complete undercut of a portion of the central electrode 510 (e.g., in the region of the pinch) or surrounding structures, with that portion bridging over the complete undercut to form a continuous electrode.

Notwithstanding the prior descriptions, the shaped central electrode may be split into two or more parallel electrodes, each shaped to produce the desired potential or potentials.

The shaped central electrode may also be implemented in trap that include electrical routing layers below the top metal layer. In this case, the shaped central electrode might not extend all the way to the wire bond pads of the ion trap solely via surface metallization and may instead be routed through the electrical routing layers.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A trap for holding atomic-based qubits, comprising:
a pair of radio frequency (RF) rails including a first RF electrode placed on a top surface of the trap along a length of the trap and a second RF electrode placed on the top surface of the trap along the length of the trap and parallel to the first RF electrode; and
a direct current (DC) electrode placed on the top surface of the trap and between the first RF electrode and the second RF electrode, wherein a portion of the DC electrode is shaped to provide desired potentials for trapping ions used as the atomic-based qubits.

2. The trap of claim 1, wherein the DC electrode is placed parallel to the first RF electrode and to the second RF electrode and along a longitudinal direction of the trap.

3. The trap of claim 1, wherein the DC electrode has a substantially uniform width along a length of the DC electrode other than the portion of the DC electrode that is shaped.

4. The trap of claim 1, wherein the trap is made of a glass die or glass substrate, and the first RF electrode, the second RF electrode, and the DC electrode are placed on the top surface of the glass die or glass substrate.

5. The trap of claim 1, wherein the portion of the DC electrode that is shaped includes a non-uniform variation of a width of the DC electrode.

6. The trap of claim 5, wherein the non-uniform variation of the width of the DC electrode is a pinching of the width of the DC electrode.

7. The trap of claim 5, wherein the non-uniform variation of the width of the DC electrode includes having one or more sections of the DC electrode with a wider width than a substantially uniform width along a length the DC electrode.

8. The trap of claim 1, wherein the first RF electrode, the second RF electrode, and the DC electrode are made of a conductive material.

9. The trap of claim 1, wherein the trap is made of a glass die or glass substrate, and the DC electrode is isolated from the first RF electrode and the second RF electrode through undercuts formed in the glass die or glass substrate.

10. The trap of claim 1, further comprising additional DC electrodes placed and routed on the top surface of the trap, an end of the additional DC electrodes being placed near the outside of the pair of RF rails and perpendicular to the pair of RF rails and the DC electrode.

11. A quantum information processing (QIP) system, comprising:
a trap including a pair of radio frequency (RF) rails having a first RF electrode placed on a top surface of the trap along a length of the trap and a second RF electrode placed on the top surface of the trap along the length of the trap and parallel to the first RF electrode, and a direct current (DC) electrode placed on the top surface of the trap and between the first RF electrode and the second RF electrode, wherein a portion of the DC electrode is shaped to provide desired potentials for trapping ions used as atomic-based qubits in the QIP system; and
an optical and trap controller configured to control the generation of signals to be applied to the trap, including RF signals to be applied to the pair of RF rails and DC signals to be applied to the DC electrode.

12. The QIP system of claim 11, wherein the DC electrode is placed parallel to the first RF electrode and to the second RF electrode and along a longitudinal axis of the trap.

13. The QIP system of claim 11, wherein the DC electrode has a substantially uniform width along a length of the DC electrode other than the portion of the DC electrode that is shaped.

14. The QIP system of claim 11, wherein the trap is made of a glass die or glass substrate, and the first RF electrode, the second RF electrode, and the DC electrode are placed on the top surface of the glass die or glass substrate.

15. The QIP system of claim 11, wherein the portion of the DC electrode that is shaped includes a non-uniform variation of a width of the DC electrode.

16. The QIP system of claim 15, wherein the non-uniform variation of the width of the DC electrode is a pinching of the width of the DC electrode or having one or more sections of the DC electrode with a wider width than a substantially uniform width along a length the DC electrode.

17. The QIP system of claim 11, wherein the first RF electrode, the second RF electrode, and the DC electrode are made of a conductive material.

18. The QIP system of claim 11, wherein the trap is made of a glass die or glass substrate, and the DC electrode is isolated from the first RF electrode and the second RF electrode through undercuts formed in the glass die or glass substrate.

19. The QIP system of claim 11, further comprising additional DC electrodes placed and routed on the top surface of the trap, an end of the additional DC electrodes being placed near the outside of the pair of RF rails and perpendicular to the pair of RF rails and the DC electrode.

20. The QIP system of claim 11, further comprising a chamber within which the trap is disposed, the optical and trap controller being configured to provide the RF signals and the DC signals to the trap within the chamber.

* * * * *